United States Patent [19]
Robache

[11] Patent Number: 5,603,203
[45] Date of Patent: Feb. 18, 1997

[54] PROCESS AND APPARATUS FOR HANDLING FOOD, CHEMICAL OR PHARMACEUTICAL PRODUCTS, AND CORRESPONDING HANDLING TRAYS

[75] Inventor: Patrick Robache, Paris, France

[73] Assignee: Mecaplastic, Bagnolet, France

[21] Appl. No.: 337,421

[22] Filed: Nov. 7, 1994

[30] Foreign Application Priority Data

Nov. 10, 1993 [FR] France .................................. 93 13412

[51] Int. Cl.⁶ .............................. B65B 7/26; B65B 47/02; B65B 59/00
[52] U.S. Cl. .............................. 53/559; 53/257; 53/377.6
[58] Field of Search .............................. 53/559, 561, 453, 53/257, 377.6

[56] References Cited

U.S. PATENT DOCUMENTS

| | | | |
|---|---|---|---|
| 2,958,168 | 11/1960 | Vogt | 53/559 X |
| 3,346,099 | 10/1967 | Thomas et al. | 206/42 |
| 3,512,332 | 5/1970 | Klein | 53/559 X |
| 3,958,394 | 5/1976 | Mahaffy et al. | 53/559 X |
| 4,229,927 | 10/1980 | Day | 53/453 X |
| 4,298,133 | 11/1981 | Davis | 220/306 |
| 4,778,048 | 10/1988 | Kaspar et al. | 206/205 |

FOREIGN PATENT DOCUMENTS

| | | |
|---|---|---|
| 0428897 | 5/1991 | European Pat. Off. . |
| 1521936 | 3/1968 | France . |
| 2268689 | 11/1975 | France . |

OTHER PUBLICATIONS

FR 9313412, French Application Search Report, Jul., 1994.

*Primary Examiner*—James F. Coan
*Attorney, Agent, or Firm*—Young & Thompson

[57] ABSTRACT

A process and an apparatus for handling food, chemical or pharmaceutical products effects sequentially the thermoforming, the loading with products, and the final production of trays for handling the products. These handling trays comprise a receiving recess (8) for the products (P) and a film (3) welded thereover, as well as a cover (9) of one piece with the recess (8) used in the handling of food, chemical or pharmaceutical products.

4 Claims, 4 Drawing Sheets

PROCESS AND APPARATUS FOR HANDLING FOOD, CHEMICAL OR PHARMACEUTICAL PRODUCTS, AND CORRESPONDING HANDLING TRAYS

FIELD OF THE INVENTION

The invention relates to a process for handling food, chemical or pharmaceutical products, to an apparatus for practicing said process, as well as a handling tray for food, chemical or pharmaceutical products.

BACKGROUND OF THE INVENTION

There are known numerous processes and apparatus for handling food, chemical or pharmaceutical products. Generally, there are used two rolls of strips of deformable materials, the first strip being adapted to be shaped to constitute recesses, and the second strip being adapted to be welded about the periphery of the recesses to constitute a film and a sealed assembly protecting the food, chemical or pharmaceutical products contained in the recesses.

The isolation of the products contained in the recesses can also be semi-sealed in the case of the second strip of deformable material having properties of a barrier to moisture and relative sealing for certain gases.

In all the known handling processes and means, access is had to the handled product by removing or tearing the film formed by the mentioned second strip. After having access to the contents of the recess, the handled product is no longer protected, which is particularly troublesome in the case of food products in large quantities. A solution proposed to overcome this drawback is again to close the upper surface of the recess by means of aluminum foil, a separate cover or packaging containing the recess and its contents.

This alternative solution has the drawback that it is necessary always to have a roll of aluminum foil or of suitable material or a supply of independent covers to close the handling trays.

SUMMARY OF THE INVENTION

The invention has for its object to overcome the mentioned drawbacks by permitting, even after tearing the film of thin material, again to close the recess to preserve its contents.

The invention has for its object a process for handling food, chemical or pharmaceutical products, comprising in combination, the following steps:

(a) gripping by pinching the first strip of thermoplastic or thermodeformable material, (b) shaping by thermoforming the strip of thermoplastic material to constitute simultaneously a recess and an associated cover, (c) feeding the food, chemical or pharmaceutical products into said recess, (d) closing said recess by welding the second strip of thermoplastic or thermoweldable material, so as to isolate said food, chemical or pharmaceutical products, (e) cutting off the contours of the recess and the cover so as to constitute a hinge permitting closing of the cover over the recess.

According to other characteristics of the invention, the first strip of thermoplastic material is preheated between steps (a) and (b), before step (d), at least a partial vacuum is applied to the interior of the recess loaded with food, chemical or pharmaceutical products, there is moreover effected a reinjection of neutral gas before welding the second strip of thermoplastic or thermoweldable material.

The invention also has for its object a handling tray for food, chemical or pharmaceutical products, of the type comprising a recess to receive said products and welded film, the recess being thermoformed simultaneously with the cover which is of one piece with this recess, the cover being connected to the recess by an articulation hinge, characterized in that the articulation hinge is formed by at least two connecting points, each connection point being separated from an adjacent connection point by a cutout in the form of a straight segment.

According to other characteristics of the invention, the recess is delimited on the side of the film by a flat margin, and the cover comprises at least on the side opposite the region of continuity of the material a snap configuration with said flat margin, the cover comprises a snap configuration with the recess, the snap formation extends substantially about all the free periphery of the cover.

The invention also has for its object an apparatus for handling food, chemical or pharmaceutical products, comprising in combination means to grasp by pinching a first strip of thermoplastic or thermoformable material; means to shape by thermoforming the strip of thermoplastic material to comprise simultaneously a recess and an associated cover; means to load food, chemical or pharmaceutical products into said recess; means to close said recess by welding a second strip of thermoplastic or thermoweldable material, so as to isolate said food, chemical or pharmaceutical products; means to cut out the shape of the recess and of the cover so as to constitute a hinge permitting closing the cover over the recess.

According to other characteristics of the invention, the means to grasp by pinching the first strip comprise horizontal chains-bearing spring clamps;

the means to thermoform the thermoplastic material strip comprise a modular assembly of shapes corresponding respectively to a cover and a recess;

the shape corresponding to the cover is mounted in fixed position relative to the body of the thermoforming means;

the shape corresponding to the recess is displaceable relative to the body of the thermoforming means under the action of a translatory control;

the device comprises means for pre-cutting out the first strip of thermoweldable material;

the apparatus comprises means for cutting out in straight segments to form the articulation hinge.

BRIEF DESCRIPTION OF THE DRAWINGS

The invention will be better understood from the description which follows, given by way of non-limiting example with reference to the accompanying drawings, in which.

DETAILED DESCRIPTION OF THE INVENTION

Figure 1:
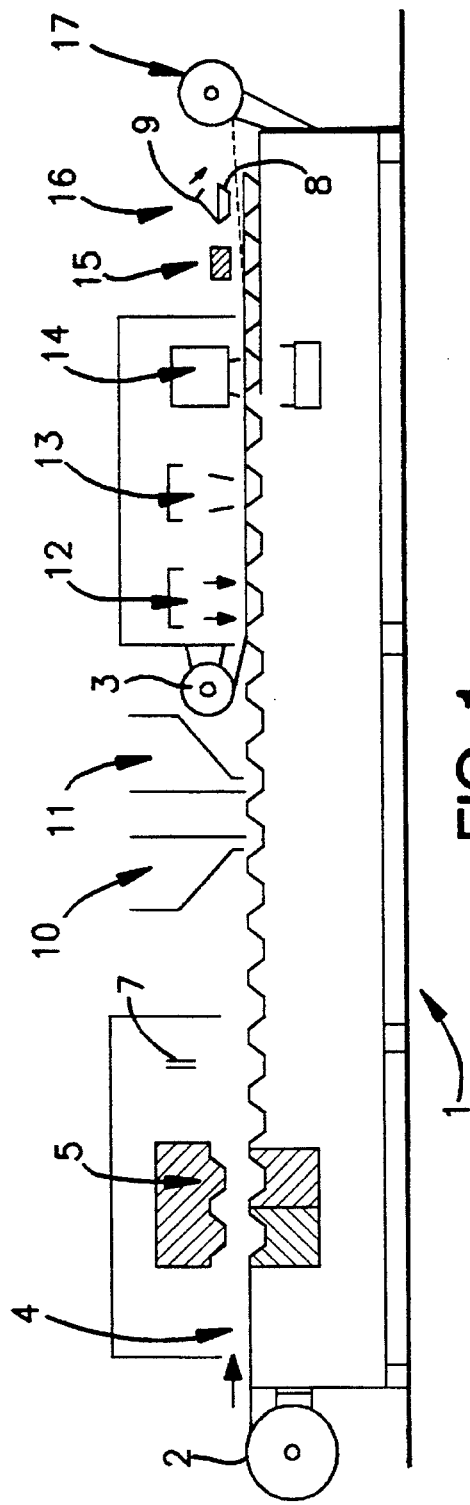
FIG. 1 is a schematic view in longitudinal cross-section of an apparatus according to the invention.
Figure 2:
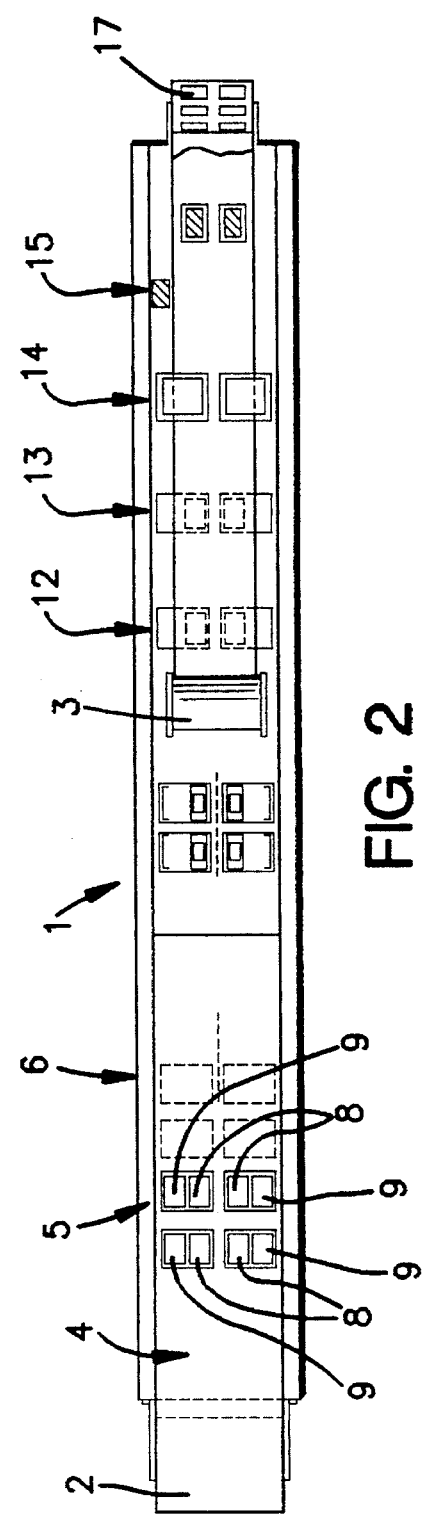
FIG. 2 is a schematic view from above of apparatus according to the invention.

Referring to FIGS. 1 and 2, an apparatus according to the invention indicated generally by reference numeral 1 is constituted by a modular assembly of carrying chassis for functional modules treating successively the first strip of thermoplastic material unrolled on a roll 2, and a second strip of thermoweldable material rolled on a roll 3. The end of the strip rolled on the roll 2 is grasped by horizontal chains on the pins of which are mounted grippers for the strip of thermoplastic material, so as to drive the strip of thermoplastic material 2 stepwise discontinuously corresponding to the advance of the strip from the roll 2 in successive cycles of the process according to the invention.

The gripping means of the first strip of thermoplastic material constituted by the horizontal chains are known per se, particularly from French Patent 2.027.741 of the applicant of the present application, and require no more detailed description.

The thermoplastic strip from roll 2 is unrolled flat to arrive at a first zone 4 shown blank in FIGS. 1 and 2, and adapted to receive a preheating apparatus for the strip of thermoplastic material, preheating effected by means of a metal plate having good thermo-conductivity in which is imbedded a heating element, for example a sheathed resistance electrically insulated relative to the metal plate.

At the outlet of the zone 4 reserved for preheating, the strip of thermoplastic material 2 advances by successive steps into a zone 5 for thermoforming comprising a thermoforming module.

The thermoforming technique used in the thermoforming zone 5 is for example the thermoforming technique known as "simple negative," which is a technique most used in which there is first effected heating of the strip of material to be thermoformed by applying it in contact with a heating plate, then the deformation itself by blowing compressed air through the mentioned heating plate provided for this purpose with the appropriate openings. Alternatively, the thermoforming station 5 could also be in accordance with the technique called "negative with mechanical assistance," a technique in which the heating of the film takes place by contact on opposites of this latter by being gripped in a sandwich between two thermally controlled plates if desired at different temperatures, then by the descent of the piston for example of metal to pre-stretch the film or strip of preformed material and finally by applying the film or thermoplastic film or strip against the mold by injection of air or compressed gas through the piston provided for this purpose with suitable openings.

Finally, in the case of relatively rigid material, the thermoforming station 5 can be according to the technique called "positive with ballooning," a technique in which there is first effected heating by contact between two thermally regulated plates, then deformation of the strip of thermoplastic material by suction within the lower portion of the tool so as to pre-stretch the thermoplastic film or strip and finally the contacting, which is to say the fitting of the film against the mold lowered for this purpose or at the level of the thermoplastic strip. In this technique of "ballooning" known per se, there is preferably obtained vertical walls of regular shape with conditioning tray corners of thickness sufficient to avoid any ultimate piercing.

Of importance, according to the invention, is that there is produced by thermoforming a recess and an associated cover from the strip of thermoplastic material from the roll 2. At the outlet of the thermoforming zone 5, there is effected if desired a piercing in a module 6 comprising a punch symbolized by reference 7 which pierces 6 to 10 times per cycle a pattern adapted for the ultimate reinjection of gas. The punching by means of the punch symbolized by reference 7 takes place between two recesses 8 disposed side by side and each connected to an associated cover 9, as will be described hereinafter.

The invention is of course applicable to the case in which there is no punching, either because there is no reinjection of gas, or because the reinjection is effected by means of a nozzle covering all the width of the tool and positioned between the recess 8 formed from the roll 2 and a diaphragm film from the roll 3.

At the outlet of the possible punching zone, the recesses 8 are filled, either manually or by means of pouring apparatus 10 or measuring apparatus 11 with products to be handled.

After the loading zone comprising if desired the apparatus 10 and 11, the recesses 8, filled at least partially with a food, chemical or pharmaceutical product, are closed by so-called "diaphragm film" unrolled from the roll 3, the unrolling operation being effected by suitable known means.

The width of the strip of thermoweldable material unrolled from the roll 3 corresponds to the cover of the recesses 8, without however covering the associated covers 9: the width of the roll 3 is thus substantially about half the width of roll 2.

The strip of thermoweldable material unrolled from the roll 3 is applied by a welding mold by high pressure jacks (of the order of 10 MN), and thermowelding of the strip 3 is effected over the recesses 8 so as to isolate the food, chemical or pharmaceutical products to be handled: to this end, a continuous welding is effected about the periphery of the edge of each recess.

As the type of welding usable, can be envisaged a flat ribbon weld, a radiated ribbon weld, a planar weld, a flange weld or a diamond point weld. This welding operation takes place in the zone 12 comprising a thermowelding module, including if desired a vacuum application module as a function of the nature of the materials to be welded and the products to be contained (thus, for certain products which are emulsions or have a high liquid content, partial vacuum cannot be used lest the product to be handled boil). The thermowelding module can also comprise in addition to the vacuum application module a reinjection module operating according to one or the other of the following systems:

the nozzle reinjection system in which the diaphragm from the roll 3 is maintained in held-back position to permit reinjection of gas and in which is used a nozzle covering all of the width of the welding tool and effecting the reinjection of gas below the diaphragm film 3 within the recess 8;

or alternatively, the reinjection technique referred to above, called "by piercing," in which the lower strip first cut off by the piercing module 6 permits effecting reinjection of gas by means of conduits located in the central position or in a position laterally of the welding mold, conduits by which the reinjection gas flows through the emplacement in the form of a tablet cut out in the lower strip 2.

The invention also covers all variants of the thermowelding module in which the welding mold is a heating mold or a heating plate permitting effecting the retraction of the diaphragm film 3 or if desired of the recess 8 about the handled product.

At the outlet of the thermowelding station 12, there is effected in the station 13 provided with suitable movable strips or blades a first cutting out of the first strip 2. This cutting out is preferably effected according to the so-called "longitudinal cutting out by crushing" technique so as to cut out only the thermoformed strip 2 along a perforated line parallel to the direction of advance. At the outlet of the pre-cutting out station 13 of the thermoforming film 2, there is provided in a shape cutting out station 14 the complete cutting out of the contour of the recess end of the adjacent cover which is of one piece with this recess.

Finally, optionally, there can be effected the application of a label, marking or indications on the welded diaphragm in a manual or automatic station 15, which permits identifying precisely the product despite the use of a transparent or non-printed film. After having applied a label in the station 15 or an analogous indicating card, for example by means of a movable arm mechanically controlled, adapted to position indicative small cards or labels on the welded diaphragm, it suffices to turn down within the station 16 for finishing the cover of the same material as the recess 8 to snap over this latter. Alternatively, the indicative labels or small cards could be rendered integral with the cover by their visible surface, so as to indicate the nature of the contents even after tearing off the film.

The strip of diaphragm unrolled from the roll 3 is preferably rolled up by means known per se on another roll 17 permitting recovery of this strip of diaphragm and avoiding any encumbrance at the point of disengagement of the packaged products.

Preferably, a roll 17 of greater width simultaneously receives the strip of thermoformable material and the strip of diaphragm.

The invention also covers variants in which the thermoweldable band rolled on the roll 3 is first labeled before being thermowelded in the thermowelding station 12; or the modifications according to which the welding is not effected by thermowelding but by high-frequency welding with the aid of a weld station supplied with a high-frequency generator of effective power about 6 kw and comprising if desired electrodes of special cutting profile to effect simultaneously the cutting off performed in the module 13 for pre-cutting the diaphragm film.

Figure 3:
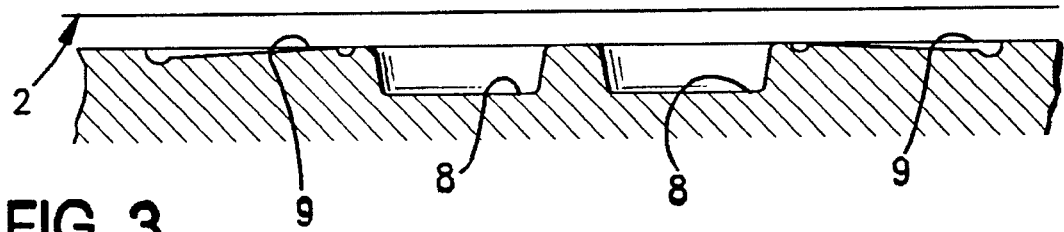
FIGS. 3–8 show schematically the successive stages of the handling process according to the invention.

With reference to FIGS. 3 to 8 showing successive views of thermoplastic strip in transverse cross-section, there is shown in FIG. 3 the thermoforming phase effected in module 5 to form simultaneously recess 8 and a cover 9 in the strip 2 of thermoplastic material advancing step-by-step according to a progress predetermined as a function of the dimensions of the corresponding mold.

Figure 4:
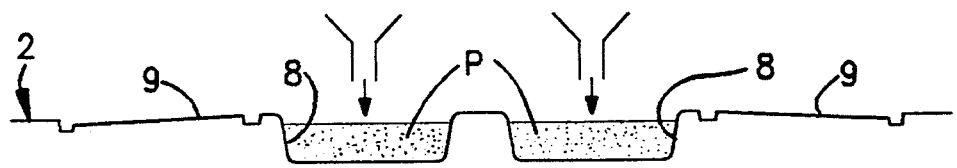

In FIG. 4, there is effected the simultaneous filling of the recess 8 by a product P. The product P fills partially each recess 8 but without overflowing.

Figure 5:
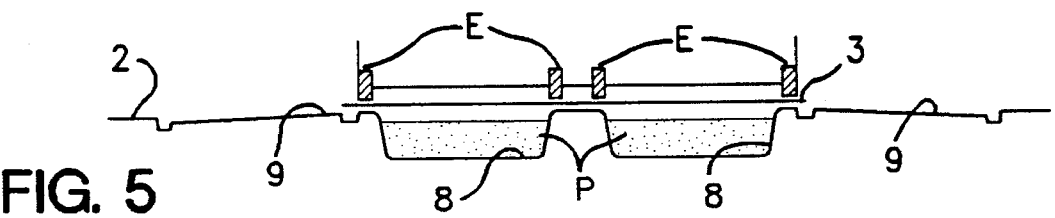

In FIG. 5, the thermoweldable strip 3 used as diaphragm is applied by welding electrodes E about the contour of each recess 8 so as to constitute a welded closure edge of the diaphragm about each recess 8.

Figure 6:
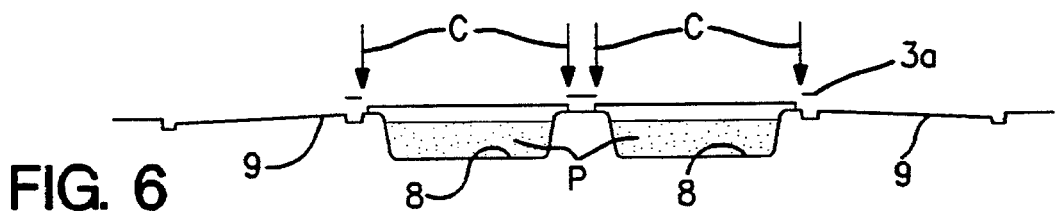

In FIG. 6, the movable knives or equivalent slicing members cut off the first strip 2 of thermoformable material according to a longitudinal perforated cutting line.

Figure 7:
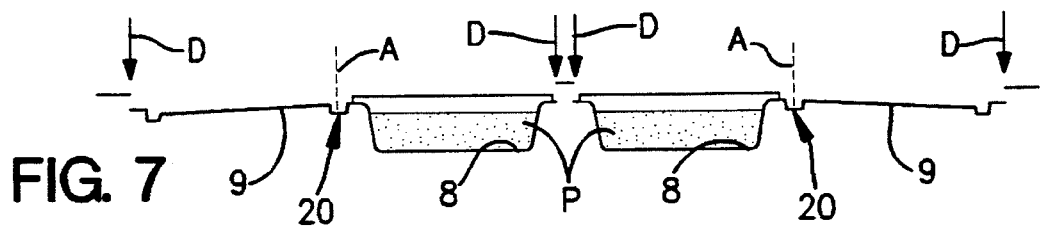

In FIG. 7 corresponding to the shaped cutting out module 14, cut out means D effects simultaneously the cutting out of a recess 8 and of an associated cover 9, while other cut out means A effect a cutting out along broken lines to locate a hinge 20 which will be described hereinafter.

Of course, the knives A cutting out the interrupted lines can be provided in the pre-cutting out module mentioned in connection with FIG. 6.

Figure 8:
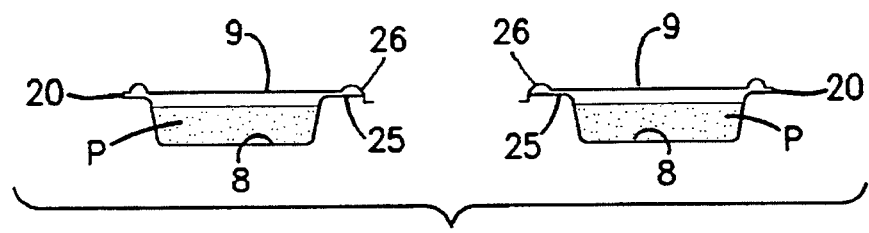

In FIG. 8, the final assembly of the handling trays according to the invention is shown after snapping of the cover 9 over the diaphragmed recess 8.

According to the invention, the covers 9 are of one piece with the associated recesses 8 and are connected to the recesses 8 by an articulation hinge comprised by at least two connecting points of thermoplastic or thermoformable material.

Figure 9:
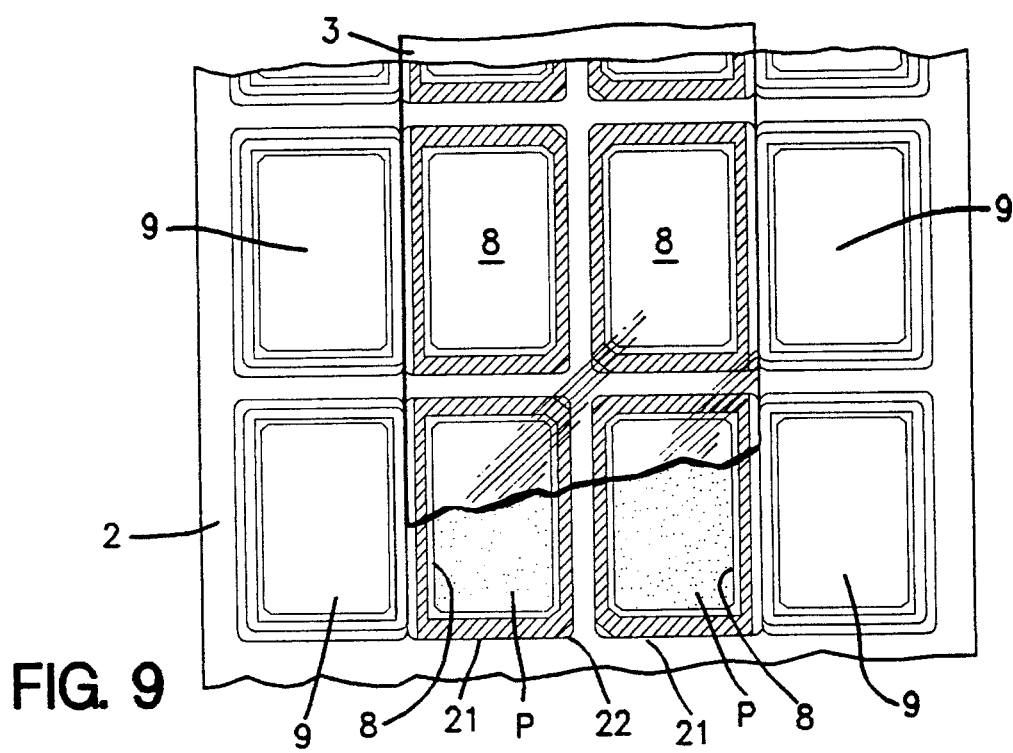
FIG. 9 shows schematically a view from above explaining the operation of the invention.

With reference to FIG. 9, identical reference numerals to those of the preceding figures designate identical or similar elements to those of the preceding figures.

The application of the diaphragm film 3 onto the thermoformed strip 2 is effected by means of welding electrodes performing welded ribbons 21 effecting a flat junction between the diaphragm film 3 and the thermoformed strip 2. On the side opposite the cover 9, there is left on each flat edge a zone 22 located at an angle permitting easily pulling off or tearing after forming the diaphragm over the recess 8.

Figure 10:
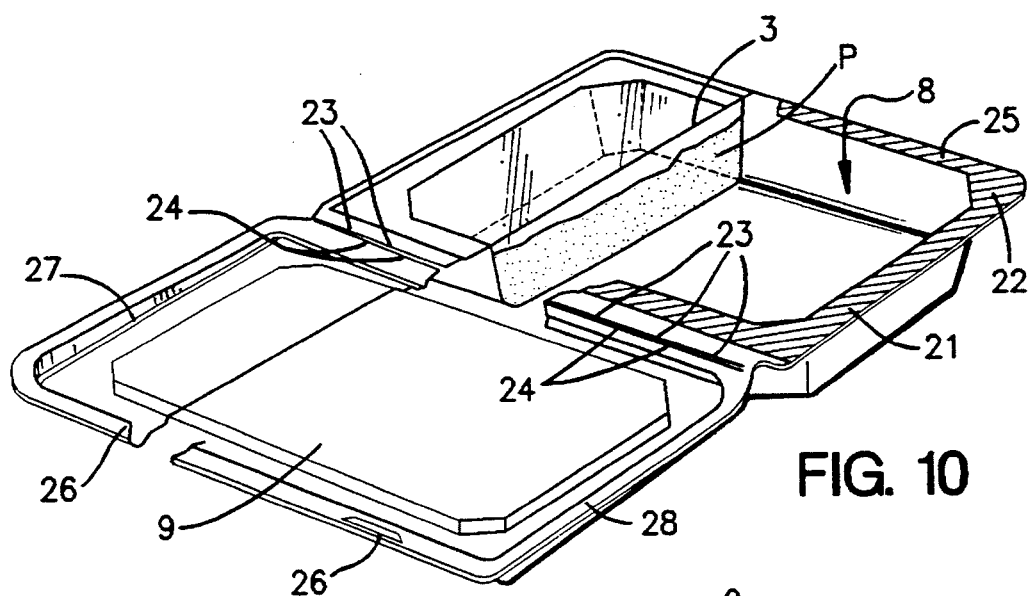
FIG. 10 shows schematically a perspective view partially cut away of a handling tray according to the invention.
Figure 11:
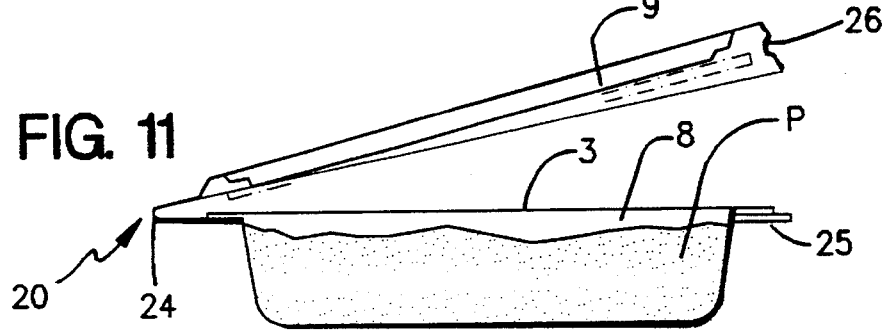
FIG. 11 shows schematically in transverse cross-section a handling tray according to the invention.

With reference to FIGS. 10 and 11, the diaphragm of material 3 closes the recess 8 containing the product P when the cover 9 is open, while the recess 8 is moreover closable by the cover 9 of one piece with the recess 8 (FIG. 11). The articulation hinge 20 is formed by connection points 23 separated by cut outs in the form of straight lines 24 formed by cut out means A of FIG. 6. The various longitudinal or transverse techniques are now well-known: by way of example there can be cited the technique of transverse cutting out by guillotine, transverse cutting out by paper cutter, transverse cutting out by emission head, transverse cutting out by crushing, longitudinal cutting out by a power-driven circular knife, longitudinal cutting out by crushing with the aid of pneumatic knives, longitudinal cutting out by shearing, etc.

The shape cutting out systems, which is to say cutting out according to a predetermined contour corresponding for example to the perimeter of the new cover and of the flat edge 24 of the recess 8, are also well-known: by way of example, there could be mentioned the shape cutting out system by punch and matrix in which the punch has the final external shape chosen for the packaging. To insure the snapping of the new cover over the flat edge 24 of the recess 8, there is provided opposite the zone of continuity of material corresponding to the connecting points 23, a snap configuration 26 snapping over the flat edge 25, so as to insure effective closing of the recess 8 by the cover 9 even after tearing off the diaphragm of material 3. The invention also covers the case in which the configuration of the snap connection 26 is disposed in another position, for example at an angle. Preferably, the snap configuration comprises not only the configuration 26 but also two adjacent configurations 27 and 28, permitting and insuring the snapping not only over the side opposite the hinge 20), but also along the three other sides of the rectangular contour of the flat edge 25 of the recess 8: it is consequently provided that the total snap configuration constituted by the configurations 26, 27 and 28 extends substantially over all the free periphery of the cover 9.

Figure 12:
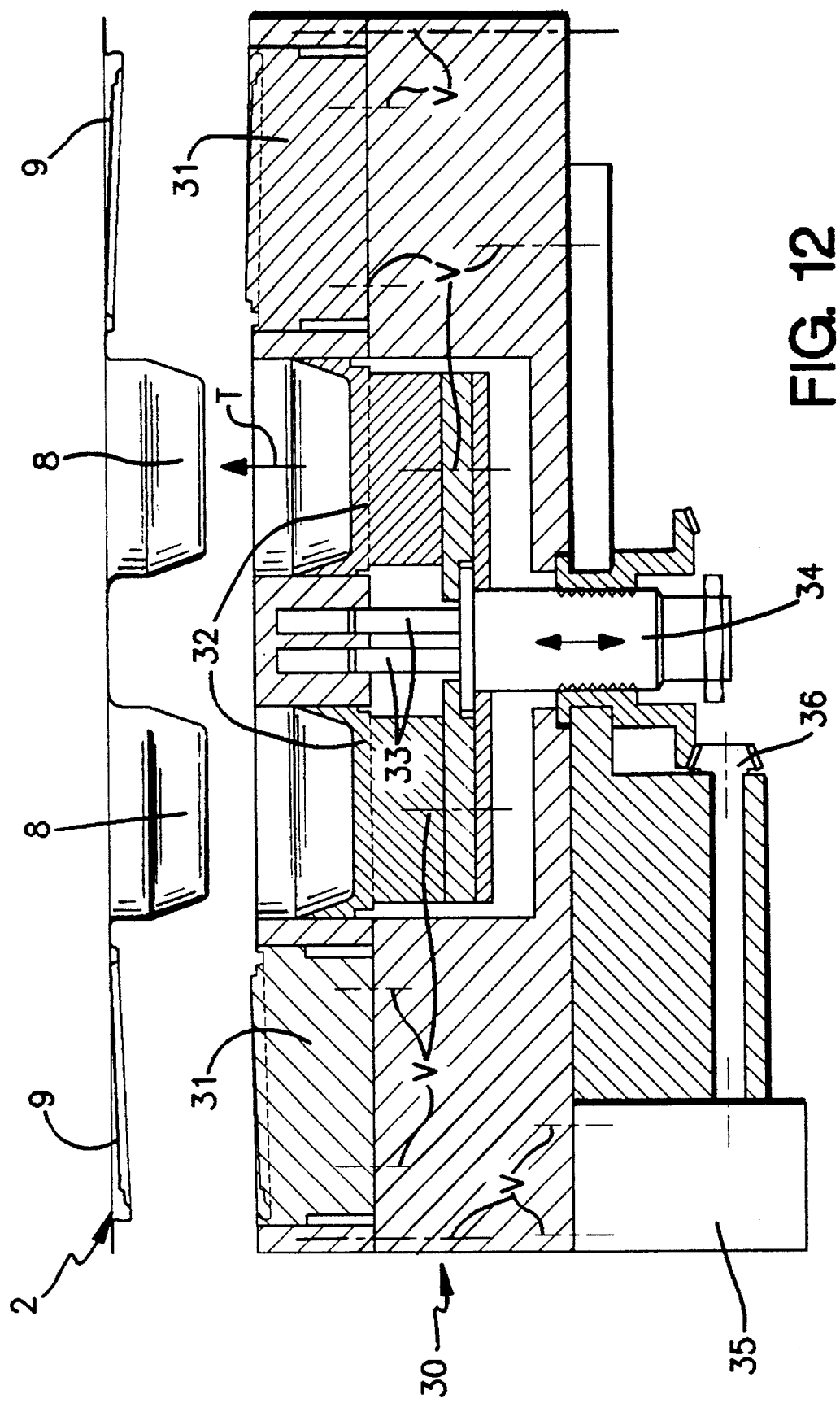
FIG. 12 shows schematically a fragmentary transverse cross-sectional view of apparatus according to the invention.

With reference to FIG. 12, a thermoforming mold 30 adapted to form in a strip of material 2 a cover 9, a recess 8, a second cover 9 and a second associated recess 8 is constructed in modular fashion by assembling of shapes 31 corresponding to the covers 9 and shapes 32 corresponding to the recesses 8. The assembly is effected in known manner by a mechanical mounting by means of screws or tie-rods represented by the broken line axes V. It is preferably provided that the shapes 32 corresponding to the recesses 8 are displaceably mounted for vertical translation in the direction of the arrow T. The control of the vertical displacement is effected by means of a column guide system 33 and a screw jack 34 controlled by a motor reducer 35 by means of angle gearing 36. Thanks to this preferred arrangement, it is possible to adjust as desired and automatically the depth of the recesses 8 as a function of the quantities of the products P to be handled.

The invention, although described with reference to particular embodiments, is by no means thereby limited but on the contrary covers all modifications of shape and all variations of embodiment within the scope and spirit of the invention. Thus, it can be provided that the system of advance by discrete steps is under the control of a two-speed motor coupled to an optical register that records the advance: this arrangement permits obtaining a step of advancing adjustable to a tenth of a millimeter relative to a standard display on a panel facing the apparatus according to the invention. Preferably, the advance between two stages of thermoforming is effected at high speed, a slowing down being provided at the end of each movement to obtain a precise stopping of the clamping chains.

Alternatively, instead of using a two-speed electric motor, there can be used an advance system with the electronic control comprising a programmable microprocessor, which is adapted to control a three-phase AC motor associated with an optoelectronic coder with two out-of-phase paths. In this case, the braking at the end of the advance is obtained by reinjection of DC current, which avoids derivatives in time and increases the reliability of positioning. Because of this, the electronic control system is not subject to any cumulative error and permits optimizing the use of thermoformable film 2. In a preferred manner, in the case of electronic control, there can also be adapted with precision the curve of advancement as a function of the products to be handled: thus, for solid products, there will be used maximum acceleration and speed of advance; for liquid products, there will be used a relatively slow curve so as to avoid a wave effect which, for liquid products, would give rise to spilling from the recesses 8; finally, for fragile or pasty products, there will be used intermediate adjustments determined by experience or by practice. All these curves of advance can be directly memorized in an associated memory and called directly from a control table, preferably comprising a tactile screen of direct dialogue with the operator. Also, according to another preferred embodiment, the assembly of the apparatus according to the invention is controlled by a programmable computer insuring all the functions of the machine and verifying instantaneously the time of welding, the placing under vacuum, reinjection of gas, thermoforming, etc. . . . as a function of desired times displayed on the analogous timers by the operator controlling the apparatus. The programmable control computer is preferably interfaced with the tactile screen to display a menu of input-output blocks comprising texts corresponding on the one hand to anomalies of the elements of the machine and of the instantaneous security blocks stopping simultaneously all the modules taking part in the apparatus according to the invention.

The practice and information system incorporated in the programmable computer and the included memories supply to the tactile screen all the general information on the machine, all the information necessary for the maintenance such as the sum of the time of operation, all the information necessary to the estimation of production such as the accounting for produced packages, all the information to effect adjustment of the types of films or strips of thermoplastic material usable (data generally entered in the form of data bases from the suppliers of thermoplastic materials), as well as all the information necessary to change and adjust each tool of each module.

I claim:

1. Apparatus for handling food, chemical or pharmaceutical products, comprising in combination:

means to advance a first strip of thermal plastic or thermoformable material;

means to shape by thermoforming the first strip to form both a recess and a cover connected together; said means to shape by thermoforming the first strip comprising a modular assembly of shapes corresponding respectively to a cover and a recess;

means to load said recess with food, chemical or pharmaceutical products;

means to close said recess by welding a second strip of thermoplastic or thermoweldable material in a manner to isolate said food, chemical or pharmaceutical products; and means to cut out contours of the recess and of the cover so as to form a hinge permitting closure of the cover over the recess, wherein said second strip has, so as to isolate said food, chemical or pharmaceutical products, a width corresponding to that of the recess, without however, covering the associated cover, and the means to advance said first strip comprise horizontal chains carrying spring clamps driving the first strip stepwise discontinuously corresponding to the advance of the first strip in successive cycles of preheating, thermoshaping, closing with a diaphragm by thermowelding and cutting out.

2. Apparatus according to claim 1, wherein the shape corresponding to the cover is mounted in fixed position relative to a body of the means to shape by thermoforming.

3. Apparatus according to claim 1, further comprising in succession means for precutting the first strip along a perforated cutting line, and means for cutting out straight elongated segments to form the hinge.

4. Apparatus for handling food, chemical or pharmaceutical products, comprising in combination:

means to advance a first strip of thermoplastic or thermoformable material;

means to shape by thermoforming the first strip to form both a recess and a cover connected together; said means to shape by thermoforming the first strip comprising a modular assembly of shape corresponding respectively to a cover and a recess;

means to load said recess with food, chemical or pharmaceutical products;

means to close said recess by welding a second strip of thermoplastic or thermoweldable material in a manner to isolate said food, chemical or pharmaceutical products; and means to cut out contours of the recess and of the cover so as to form a hinge permitting closure of the cover over the recess, wherein the shape corresponding to the recess is displaceable relative to a body of the means to shape by thermoforming under the action of control means in translation.

\* \* \* \* \*